UNITED STATES PATENT OFFICE.

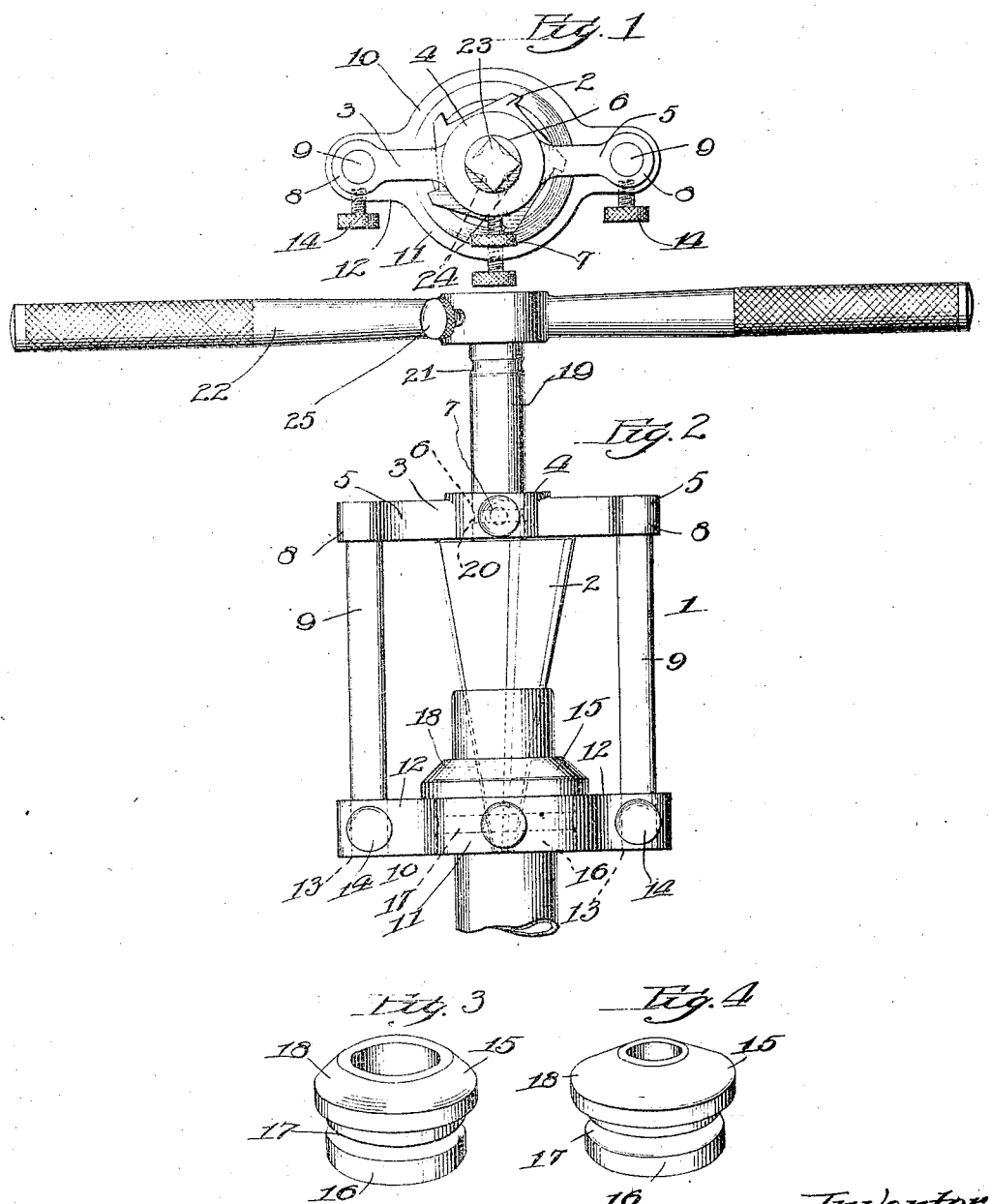

PETER NEERUP, OF LOUISIANA, MISSOURI, ASSIGNOR TO RELIABLE TOOL & SPECIALTY COMPANY, OF LOUISIANA, MISSOURI, A CORPORATION OF MISSOURI.

PIPE-REAMER.

979,786.   Specification of Letters Patent.   Patented Dec. 27, 1910.

Application filed September 30, 1907. Serial No. 395,124.

*To all whom it may concern:*

Be it known that I, PETER NEERUP, a citizen of the United States, residing at Louisiana, in the county of Pike and State of Missouri, have invented certain new and useful Improvements in Pipe-Reamers, of which the following is a specification.

My invention relates to reamers adapted to remove from the inside of pipes or conduits the burs generally resulting from the use of pipe-cutting tools or the like, and has for one of its objects the production of a pipe reamer which is self-centering.

Another object of my invention is the production of a reamer that may be used upon various sizes of pipes.

My invention also relates to the other improvements in pipe reamers hereinafter set forth.

Referring to the accompanying drawings, Figure 1 is a top plan view of a pipe reamer embodying my invention, the hand lever being removed. Fig. 2 is a side elevation of the reamer showing the same in position on a pipe. Figs. 3 and 4 illustrate two sizes of pipe collars used in connection with the reamer.

The present embodiment of my invention comprises a frame 1 and a reamer 2. A bracket 3 forms the upper portion of said frame and consists of a bearing collar 4 and two arms 5 extending from opposite sides of said collar. The said collar is provided with a finished bearing opening 6 and a set screw 7. At the outer ends of the arms 5 are lugs 8 to which are rigidly secured the upper ends of two guide rods 9. Said guide rods extend downward and may be of any suitable length. A second bracket 10 having a bearing collar 11 and arms 12 extending therefrom in opposite directions, is adapted to be slidably adjusted upon the guide rods 9. To this end openings 13 in the arms 12 are alined with said rods and set screws 14 are arranged in said arms to engage said rods.

A pipe collar 15 adapted to be inserted in the bearing collar 11 comprises the sleeve 16 having an annular groove 17 thereon and an upper end flange 18 adapted to rest upon the upper face of the bracket 10. A number of these pipe collars is provided with the reamer, the bores of the various collars (Figs. 3 and 4) being arranged to fit various sizes of pipes.

A shaft 19 fixed to the upper end of the reamer 2 is rotatably mounted within the bearing collar 4. Annular grooves 20 and 21 are formed near the lower and upper ends, respectively, of said shaft for the reception of the inner end of the set screw 7. Said screw when in engagement with said grooves, prevents the reamer from dropping out of proper position in the frame, but does not interfere with the rotation of said reamer. A hand lever 22 is arranged to be mounted on the squared head 23 of the shaft 19, said squared head having indents 24 in its face adapted to seat the set screw 25 in said hand lever. If desired, a ratchet handle may be substituted for the lever 22, for use in limited spaces. The reamer 2 is, in this instance, a five-face reamer of medium taper but it is obvious that the pitch and number of cutting edges may be varied as desired.

In use, the lower bracket 10 is removed from the guide rods 9, a pipe collar of a bore suitable to the pipe to be reamed is placed in the bearing collar 11, and the bracket 10 replaced on the guide rods. The frame 1 is then placed in position over the end of the pipe to be reamed, said frame sliding down until the reamer and the pipe are in engagement. If desired, the lower bracket 10 may then be raised to the upper end of the pipe to secure greater stability and to insure better centering of the reamer, which is then rotated until the inner obstruction or bur is removed. The shaft may be slid down in the collar 4, if desired, in reaming the larger sizes of pipe. It will be noted that the annular grooves in the shaft 19 and pipe collars 15 and the set screw 7 prevent endwise movement of the shaft 19 without interfering with its rotation.

The adjustability of the lower bracket 10 permits of locating said bracket so that the reamer 2 shall be properly supported with reference to the pipe, thus insuring stability of the tool and accurate centering. With certain sizes of frame and reamer, it is also necessary to remove the bracket 10 for the insertion and removal of the interchangeable pipe collars 15.

I do not limit myself to the exact construction described herein as my invention may be embodied in devices of various designs.

I claim as my invention:

1. In a pipe reamer, in combination, a bracket, a reamer rotatably mounted in said bracket and adjustable longitudinally therein, guide rods having one end fixed in said bracket, a second bracket comprising a bearing sleeve and arms extending outwardly from said sleeve, a pipe collar removably fitting in said sleeve, means for fixing said collar in said sleeve, the arms of said second bracket being slidably mounted on said guide rods and being removable therefrom to permit of removing said pipe collar from its sleeve, and means for fixing said arms upon said guide rods.

2. In a pipe reamer, in combination, a frame comprising an upper bracket, a lower bracket, and guide rods fixed in the upper bracket, the lower bracket being slidably mounted on said guide rods; means for fixing said lower bracket on said guide rods; a shaft rotatably mounted in the upper bracket and having a plurality of annular grooves in its periphery; a reamer fixed to the inner end of said shaft and lying within said frame; a set screw seated in said upper bracket, the inner end of said set screw being arranged to lie in either of said annular grooves for rotatably securing said shaft in longitudinally adjusted positions in said upper bracket; said lower bracket having an opening therethrough; a pipe collar fitting in said opening; and means for securing said collar in said opening, said lower bracket being withdrawable from said rods to permit of removing said pipe collar.

PETER NEERUP.

Witnesses.
EUGENE PEARSON,
A. B. PRETTYMAN.